United States Patent
Hasegawa

(10) Patent No.: US 9,285,864 B2
(45) Date of Patent: Mar. 15, 2016

(54) MOBILE TERMINAL DEVICE, MEDIUM AND CONTROL METHOD

(71) Applicant: FUJITSU LIMITED, Kawasaki-shi (JP)

(72) Inventor: Eiji Hasegawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 148 days.

(21) Appl. No.: 13/661,569

(22) Filed: Oct. 26, 2012

(65) Prior Publication Data

US 2013/0165181 A1 Jun. 27, 2013

(30) Foreign Application Priority Data

Dec. 21, 2011 (JP) ................. 2011-280591

(51) Int. Cl.
*H04M 1/00* (2006.01)
*G06F 1/32* (2006.01)
(52) U.S. Cl.
CPC .............. *G06F 1/324* (2013.01); *G06F 1/3293* (2013.01); *Y02B 60/121* (2013.01); *Y02B 60/1217* (2013.01)
(58) Field of Classification Search
CPC .................................................. H04W 88/02
USPC ..................................................... 455/550.1
See application file for complete search history.

(56) References Cited

U.S. PATENT DOCUMENTS

| 7,929,985 | B2 * | 4/2011 | Khayrallah et al. ....... 455/550.1 |
| 2003/0073886 | A1 * | 4/2003 | Yanagidaira et al. ......... 600/300 |
| 2004/0207540 | A1 * | 10/2004 | Tanaka ..................... 340/870.07 |
| 2007/0027969 | A1 | 2/2007 | Ishida |

FOREIGN PATENT DOCUMENTS

| JP | 10-263255 | 10/1998 |
| JP | 2001-304037 | 10/2001 |
| JP | 2004-145875 | 5/2004 |
| JP | 2007-034737 | 2/2007 |
| JP | 2011-139301 | 7/2011 |

OTHER PUBLICATIONS

Chinese Office Action dated Feb. 28, 2015 in corresponding Chinese Patent Application No. 201210472767.5, seven pages.
Japanese Office Action dated Jun. 2, 2015 in corresponding Japanese Patent Application No. 2011-280591, 4 pages.
Chinese Office Action dated Oct. 23, 2015 in corresponding Chinese Patent Application No. 201210472767.5, 8 pages.

* cited by examiner

*Primary Examiner* — Huy C Ho
(74) *Attorney, Agent, or Firm* — Staas & Halsey LLP

(57) ABSTRACT

A mobile terminal device includes a first processor that processes data acquired by a sensor, and a second processor that transmits the data acquired by the sensor to the first processor. The first processor acquires a transmission condition corresponding to state information of the mobile terminal with reference to association information and transmits the transmission condition to the second processor. The association information associates a transmission condition with state information. The transmission condition is a condition for transmitting the data acquired by the sensor from the second processor to the first processor. The second processor transmits the data acquired by the sensor to the first processor in accordance with the transmission condition transmitted by the first processor.

9 Claims, 16 Drawing Sheets

MOBILE TERMINAL DEVICE, MEDIUM AND CONTROL METHOD

CROSS-REFERENCE TO RELATED APPLICATION

This application is based upon and claims the benefit of priority of the prior Japanese Patent Application No. 2011-280591, filed on Dec. 21, 2011, the entire contents of which are incorporated herein by reference.

FIELD

The embodiments discussed herein are related to a mobile terminal device, a medium and a control method.

BACKGROUND

Mobile terminal devices such as smart phones tend to include many sensors. The sensors are used for users' operations of the mobile terminal devices or used to detect behaviors of the users.

Among the mobile terminal devices, there is a mobile terminal device that is configured so that until an interrupt is provided from outside the mobile terminal device, a CPU that processes applications is in a sleep state in order to reduce power to be consumed.

In addition, there is a mobile terminal device that includes a CPU and a microcomputer that consumes lower power than the CPU, controls a sensor and processes data acquired from the sensor. In the mobile terminal device having this configuration, the microcomputer may control the sensor and process the data acquired from the sensor during the time when the CPU is in a sleep state.

In order for a mobile terminal device to calculate, on the basis of the result of a measurement executed by an acceleration sensor, the number of steps that a user has taken, the mobile terminal device acquires several tens of acceleration data items per second. It is, however, sufficient if the process of calculating the number of the steps from the acquired acceleration data items is executed before the user views the number of the steps. Thus, the data acquired from the acceleration sensor may not be processed in real time in some cases.

For such cases, there is a mobile terminal device provided with a microcomputer that has a storage unit that temporarily store data acquired from a sensor. In this mobile terminal device, when a CPU releases a sleep state (or wakes up), the microcomputer transmits data accumulated in the storage unit to the CPU and may thereby reduce the frequency of changes from the sleep state to a wake state and vice versa and save power to be consumed. The mobile terminal device increases a period of time for the CPU to be in the wake state or the sleep state and thereby saves power to be consumed.

As the period of time for the CPU to be in the wake state is increased, the difference between the time when the data is acquired from the sensor and the time when the CPU processes the data acquired from the sensor increases. For an application for which data, such as data entered from a keyboard for a game, is transferred from the sensor to the CPU in real time, it is desirable that the frequency of the transfer of the data be increased in some cases.

In order to appropriately set the frequency of transfer of data from the sensor to the CPU for the application and save power to be consumed, it is preferable that an appropriate frequency of transfer of data be set in the mobile terminal device.

In mobile terminal devices that are used in recent years, however, not only applications that are pre-stored in the mobile terminal devices but also applications that are separately downloaded by users are used in many cases. The downloaded applications are not managed by manufacturers of the mobile terminal devices. Thus, information of the frequencies of transfer of data for the downloaded applications is not pre-stored in the mobile terminal devices.

Japanese Laid-open Patent Publication No. 2004-145875 is an example of related art.

SUMMARY

According to an aspect of the invention, a mobile terminal device includes a first processor that processes data acquired by a sensor, and a second processor that transmits the data acquired by the sensor to the first processor, wherein the first processor, acquires a transmission condition corresponding to state information of the mobile terminal with reference to association information and transmits the transmission condition to the second processor, the association information associating a transmission condition with state information, the transmission condition being a condition for transmitting the data acquired by the sensor from the second processor to the first processor, and wherein the second processor transmits the data acquired by the sensor to the first processor in accordance with the transmission condition transmitted by the first processor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, a mobile terminal device 100 according to a first embodiment is described.

First Embodiment

Figure 1:
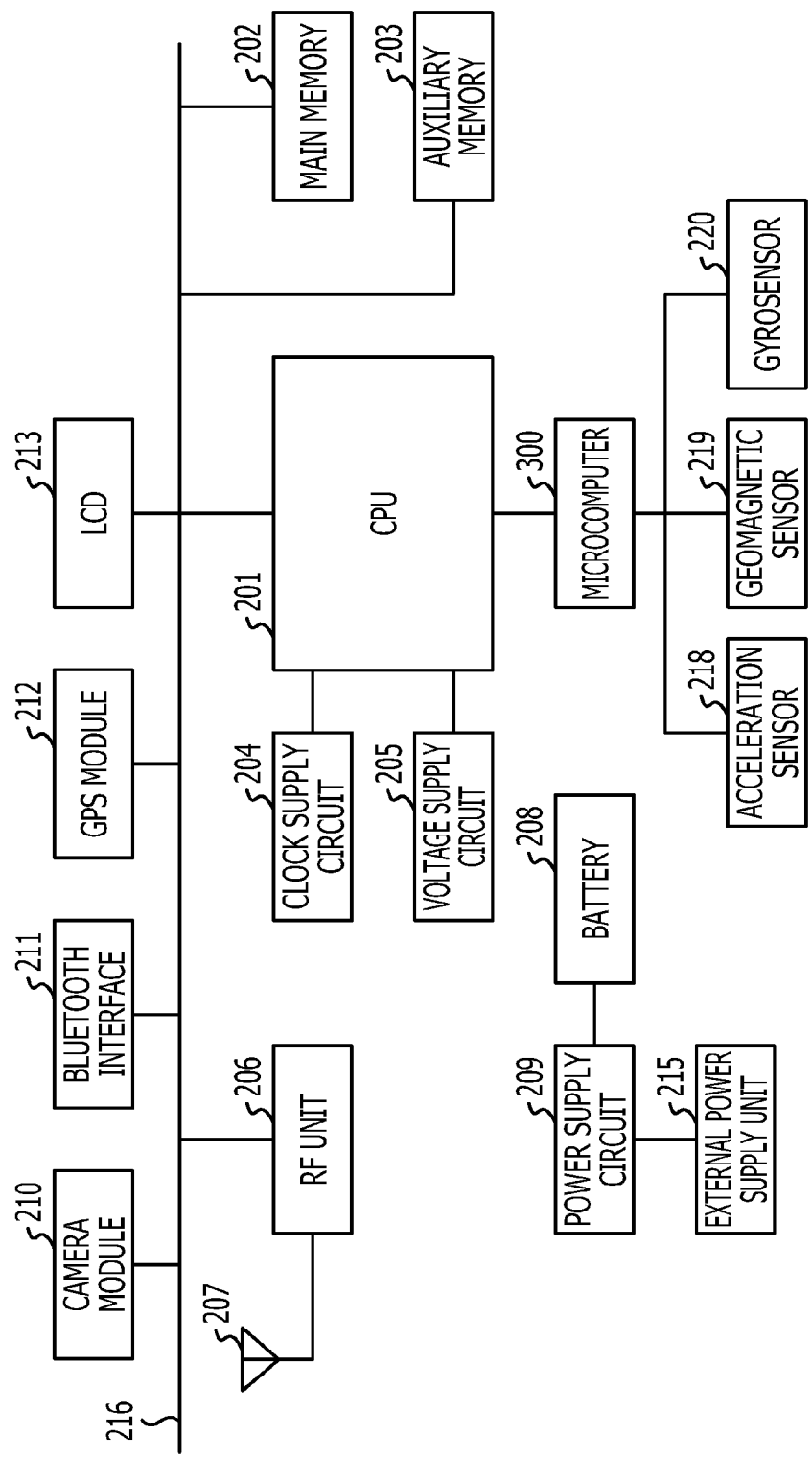
FIG. 1 is a diagram illustrating a hardware configuration of a mobile terminal device.

FIG. 1 is a diagram illustrating a hardware configuration of the mobile terminal device 100 according to the first embodiment. The mobile terminal device 100 illustrated in FIG. 1 is a mobile information terminal such as a smart phone or a tablet personal computer (PC).

The mobile terminal device 100 includes a central processing unit (CPU) 201, a main memory 202, an auxiliary memory 203, a clock supply circuit 204, a voltage supply circuit 205, a radio frequency (RF) unit 206, an antenna 207 and a battery 208 as hardware modules. The mobile terminal device 100 further includes a power supply circuit 209, a camera module 210, a Bluetooth interface 211, a GPS module 212, a liquid crystal display (LCD) 213, an external power supply unit 215, a microcomputer 300, an acceleration sensor 218, a geomagnetic sensor 219 and a gyrosensor 220 as hardware modules. The hardware modules are connected to each other through a bus 216, for example.

The CPU 201 controls the whole mobile terminal device 100. The CPU 201 operates on the basis of a clock signal supplied from the clock supply circuit 204 and a voltage supplied from the power supply circuit 205. The CPU 201 completely stops operating if a software process is not executed. The CPU 201 is in a sleep state until an interrupt is provided from outside the mobile terminal device 100. Thus, the CPU 201 reduces power to be consumed. The CPU 201 may be a quad-core CPU or include an arbitrary number of cores.

The main memory 202 is, for example, a random access memory (RAM). The main memory 202 is used as a work area of the CPU 201.

The auxiliary memory 203 is a nonvolatile memory such as a flash memory, for example. The auxiliary memory 203 stores various programs such as an operating system (OS) to be used to operate the mobile terminal device 100. The programs stored in the auxiliary memory 203 are loaded into the main memory 202 and executed by the CPU 201. By causing the CPU 201 to execute the programs, various programs (described later) are executed in the mobile terminal device 100.

The clock supply circuit 204 supplies a frequency-variable clock signal to the CPU 201. The clock supply circuit 204 may be achieved by a crystal oscillator for oscillating the clock signal or a real time clock (RTC). The voltage supply circuit 205 uses power supplied form the power supply circuit 209 and thereby supplies a variable voltage to the CPU 201. The voltage supply circuit 205 may be achieved by a voltage detector and a voltage regulator, or the like.

The RF unit 206 has a function of transmitting a high-frequency signal from the antenna 207 to another wireless communication device. The RF unit 206 is controlled by the CPU 201 and thereby transmits the high-frequency signal. The RF unit 206 has a function of converting a high-frequency signal received by the antenna 207 into a baseband signal and outputting the baseband signal to the CPU 201.

The battery 208 supplies power to the power supply circuit 209. The battery 208 may be achieved by a battery such as a lithium ion battery and an integrated circuit (IC) for protecting the battery, or the like. The power supply circuit 209 supplies the power supplied from the battery 208 to the hardware modules of the mobile terminal device 100 through a power supply line (not illustrated). When the external power supply unit 215 is connected to an external power supply, the power supply circuit 209 may supply power supplied from the external power supply unit 215 to the hardware modules of the mobile terminal device 100. The power supply circuit 209 may be achieved by a switching regulator and a voltage regulator, or the like.

The camera module 210 is controlled by the CPU 201, thereby images an object and acquires video image data obtained by imaging the object. The Bluetooth interface 211 is a communication interface that is controlled by the CPU 201 and thereby uses Bluetooth (registered trademark) to perform wireless communication with the other wireless communication device. The mobile terminal device 100 may include the Bluetooth interface 211 and a wireless communication interface such as a local area network (LAN) interface.

The GPS module 212 is controlled by the CPU 201, thereby receives a radio wave emitted by a satellite and acquires positional information indicating the current position of the mobile terminal device 100 on the earth.

The LCD 213 is an image display device that is controlled by the CPU 201 and thereby displays an image for a user. The LCD 213 may be a touch panel that has a touch pad with a function of receiving positional information.

The acceleration sensor 218 measures acceleration of the mobile terminal device 100. The geomagnetic sensor 219 measures a direction of a magnetic field. The gyrosensor 220 measures a change in a direction in which the mobile terminal device 100 moves. In the present embodiment, the mobile terminal device 100 includes the acceleration sensor 218, the geomagnetic sensor 219 and the gyrosensor 220. The mobile terminal device 100, however, may further include an illuminance sensor, an inclination sensor, a pressure sensor, a proximity sensor, a temperature sensor and the like.

The microcomputer 300 processes sensor data acquired from the sensors 218 to 220, buffers the sensor data, and collectively transmits a plurality of sensor data items to the CPU 201 at one time. Thus, even when the CPU 201 is in the sleep state, the microcomputer 300 may control the acceleration sensor 218, the geomagnetic sensor 219 and the gyrosensor 220 and acquire the sensor data from the acceleration sensor 218, the geomagnetic sensor 219 and the gyrosensor 220.

Figure 2:
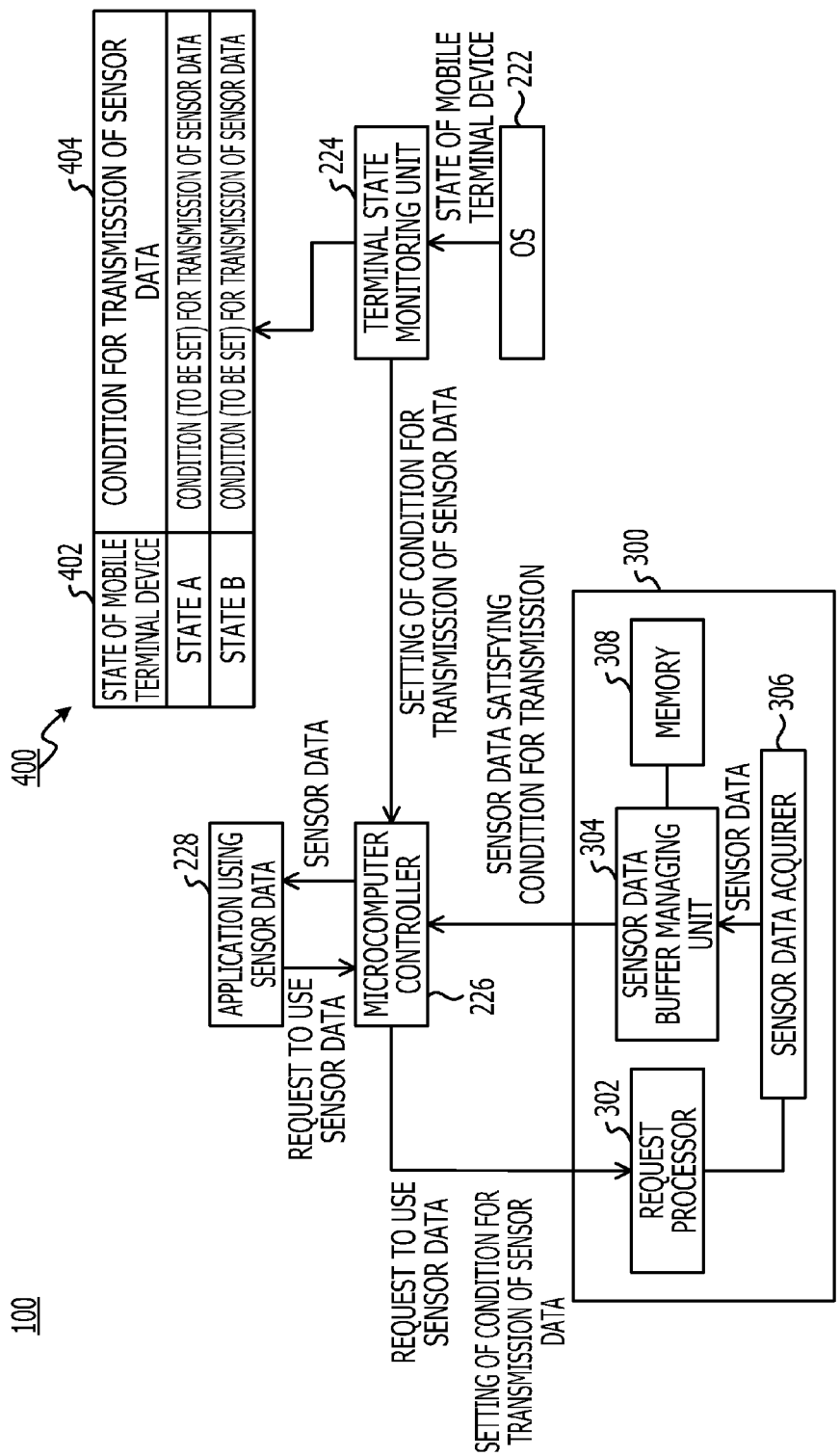
FIG. 2 is a first block diagram illustrating a configuration of the mobile terminal device.

FIG. 2 is a block diagram illustrating a configuration of the mobile terminal device 100 according to the first embodiment. The mobile terminal device 100 includes an OS 222, a terminal state monitoring unit 224, a microcomputer controller 226, an application 228 and a sensor data transmission condition table 400. The application 228 uses sensor data. The OS 222, the terminal state monitoring unit 224, the microcomputer controller 226 and the application 228 using the sensor data are achieved by causing the CPU 201 of the mobile terminal device 100 to execute the various programs stored in the auxiliary memory 203. The sensor data transmission condition table 400 has an item 402 for states of the mobile terminal device 100 and an item 404 for setting parameters to be set for the states of the mobile terminal device 100.

The application 228 that uses the sensor data provides a request to use the sensor data to the microcomputer controller 226 through a sensor control API published by the microcomputer controller 226. In addition, the application 228 that uses the sensor data acquires the sensor data from the microcomputer controller 226.

The terminal state monitoring unit 224 acquires information of the state of the mobile terminal device 100 from the OS 222. The terminal state monitoring unit 224 references the sensor data transmission condition table 400. When the state of the mobile terminal device 100 is changed to a state described in the sensor data transmission condition table 400, the terminal state monitoring unit 224 sets a condition for transmission of the sensor data in the microcomputer controller 226, while the condition corresponds to the changed state. The condition is a time interval to transmit the sensor data, for example.

The microcomputer controller 226 receives the request to use the sensor data from the application 228 and the condition for the transmission of the sensor data from the terminal state monitoring unit 224. The microcomputer controller 226 transmits the received request and the received condition to the microcomputer 300. When the microcomputer 300 has stored therein sensor data that satisfies the condition, the microcomputer controller 226 receives the sensor data satisfying the condition from the microcomputer 300. The microcomputer controller 226 transmits the received sensor data satisfying the condition to the application 228 that uses the sensor data.

The microcomputer 300 includes a request processor 302, a sensor data buffer managing unit 304, a sensor data acquirer 306 and a memory 308.

The request processor 302 receives the request to use the sensor data from the microcomputer controller 226. The request processor 302 causes the sensor data acquirer 306 to operate or stops the sensor data acquirer 306 on the basis of the received request to use the sensor data. The request processor 302 receives the condition for the transmission of the sensor data from the microcomputer controller 226 and sets the condition for the transmission of the sensor data in the sensor data buffer managing unit 304 on the basis of the received condition for the transmission of the sensor data.

The sensor data acquirer 306 acquires the sensor data from the acceleration sensor 218, the geomagnetic sensor 219 and the gyrosensor 220. The sensor data acquirer 306 transmits the acquired sensor data to the sensor data buffer managing unit 304. FIG. 1 illustrates the configuration in which the acceleration sensor 218, the geomagnetic sensor 219, the gyrosensor 220 and the microcomputer 300 are independent of each other. The microcomputer 300, however, may include the acceleration sensor 218, the geomagnetic sensor 219 and the gyrosensor 220.

If the sensor data satisfies the condition for the transmission of the sensor data, the sensor data buffer managing unit 304 sequentially transmits the sensor data buffered in the memory 308 to the microcomputer controller 226 in order from the oldest sensor data on the basis of the condition for the transmission of the sensor data. On the other hand, if the sensor data does not satisfy the condition for the transmission of the sensor data, the sensor data buffer managing unit 304 causes the sensor data to be buffered in the memory 308. The microcomputer controller 226 sequentially transmits the sensor data received from the sensor data buffer managing unit 304 to the application 228 that uses the sensor data.

Second Embodiment

Figure 3:
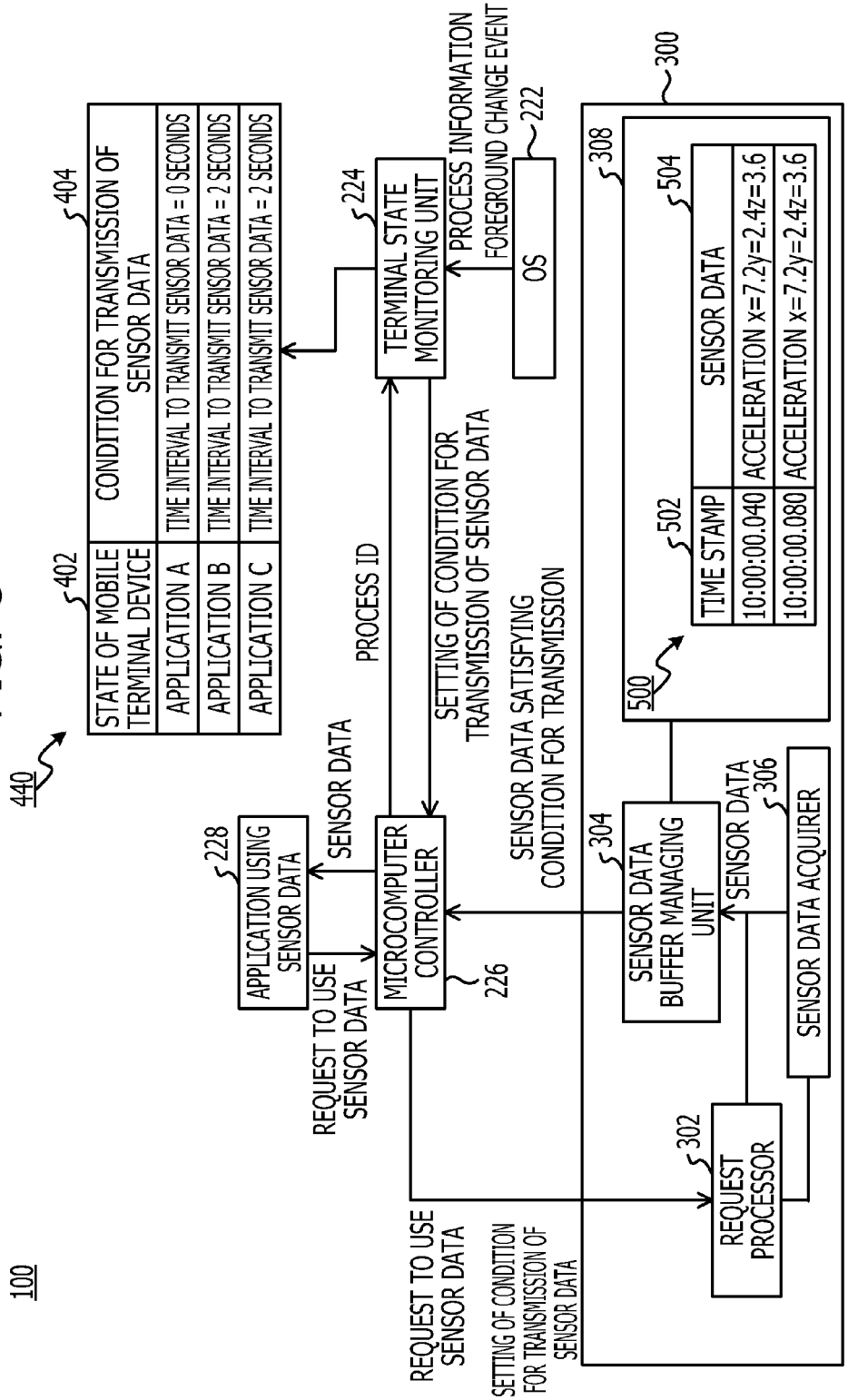
FIG. 3 is a second block diagram illustrating a configuration of the mobile terminal device.

FIG. 3 is a block diagram illustrating a configuration of the mobile terminal device 100 according to a second embodiment. Parts that are described with reference to FIG. 2 and illustrated in FIG. 3 are indicated by the same reference numerals as those illustrated in FIG. 2, and a description thereof is omitted. For example, when a plurality of applications are simultaneously executed, and a sensing application that uses the sensor data and is provided for a smart phone that is an example of the mobile terminal device is executed in the foreground, real-time transmission of sensor data may not be desired for the sensing application. If the real-time transmission of the sensor data is not desired for the application that uses the sensor data and is being executed in the foreground, the microcomputer controller 226 may control the microcomputer 300 so as to cause the microcomputer 300 to buffer the sensor data. Thus, the terminal state monitoring unit 224 monitors process information acquired from the OS 222 and a foreground change event acquired from the OS 222. An application that is executed in the foreground is an application of which an execution result is displayed on the LCD 213. An application that is executed in the background is an application of which an execution result is not displayed on the LCD 213.

When receiving the request to use the sensor data from the application 228 that uses the sensor data, the microcomputer controller 226 transmits, to the terminal state monitoring unit 224, a process ID that identifies a process of the application 228. The terminal state monitoring unit 224 acquires, on the basis of the process ID received from the microcomputer controller 226, the type of the application in which the process is executed. If the application 228 that uses the sensor data is executed in the foreground, and real-time transmission of the sensor data is desired for the application 228 that uses the sensor data, the microcomputer controller 226 controls the microcomputer 300 so as not to cause the microcomputer 300 to buffer the sensor data in the memory 308. If the application 228 that uses the sensor data is executed in the foreground, and the real-time transmission of the sensor data is not desired for the application 228 that uses the sensor data, the microcomputer controller 226 controls the microcomputer 300 so as to cause the microcomputer 300 to buffer the sensor data in the memory 308.

The terminal state monitoring unit 224 stores a process ID list of applications that use sensor data. If an application that is executed in the foreground is changed, and real-time transmission of sensor data is desired for the application that uses the sensor data and is being executed in the foreground, the terminal state monitoring unit 224 causes the microcomputer controller 226 to control the microcomputer 300 so as not to cause the microcomputer 300 to buffer the sensor data in the memory 308. If the application that is executed in the foreground is changed, and the real-time transmission of the sensor data is not desired for the application that uses the sensor data and is being executed in the foreground, the terminal state monitoring unit 224 causes the microcomputer controller 226 to control the microcomputer 300 so as to cause the microcomputer 300 to buffer the sensor data in the memory 308.

A sensor data transmission condition table 440 has an item 402 for states of the mobile terminal device 100 and an item 404 for conditions for transmission of sensor data. If the real-time transmission of the sensor data is desired for the application that uses the sensor data and is executed in the foreground, 0 (seconds) is described in the item 404 as a time interval to transmit the sensor data in order not to buffer the sensor data. If the real-time transmission of the sensor data is not desired for the application that uses the sensor data and is executed in the foreground, 2 (seconds) is described in the item 404 as the time interval to transmit the sensor data in order to buffer the sensor data. The sensor data transmission condition table 440 indicates that when an "application A" is executed in the foreground, real-time transmission of sensor data is desired for the "application A", and when an "application B" and an "application C" are executed in the foreground, the real-time transmission of the sensor data is not desired for the "application B" and the "application C". In the present embodiment, the sensor data transmission condition table 440 indicates the three applications. The number of applications, however, may be any number.

If an application that uses sensor data and is executed in the foreground exists, the OS 222 notifies the terminal state monitoring unit 224 of the fact that the application that uses the sensor data and is executed in the foreground exists.

Figure 4:
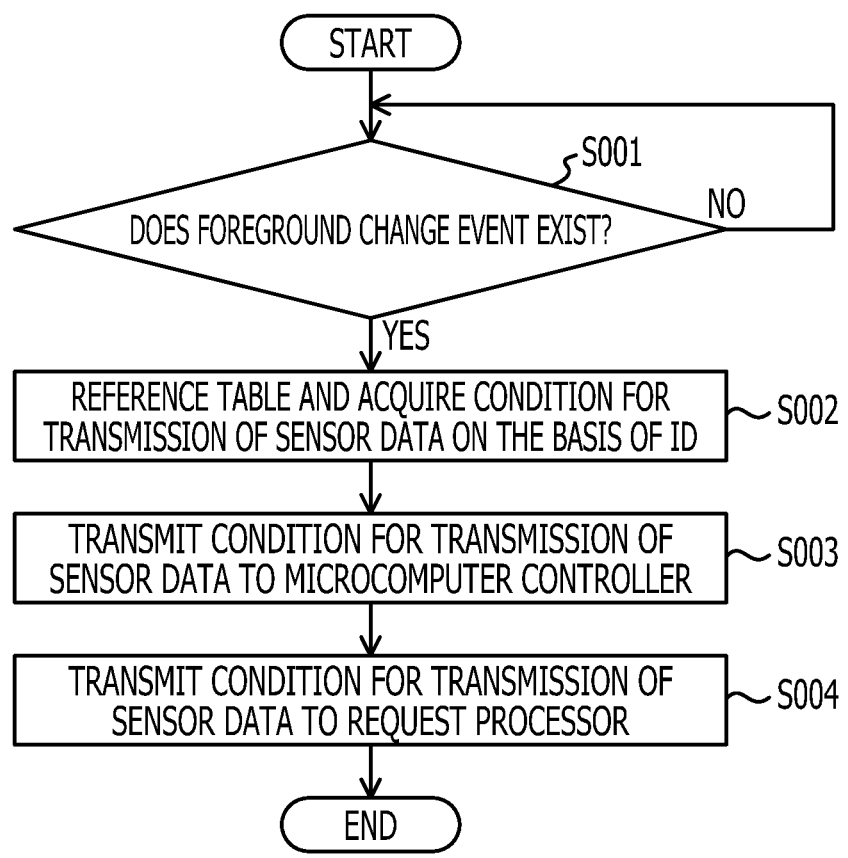
FIG. 4 is a first flowchart of a process that is executed by the mobile terminal device.
Figure 5:
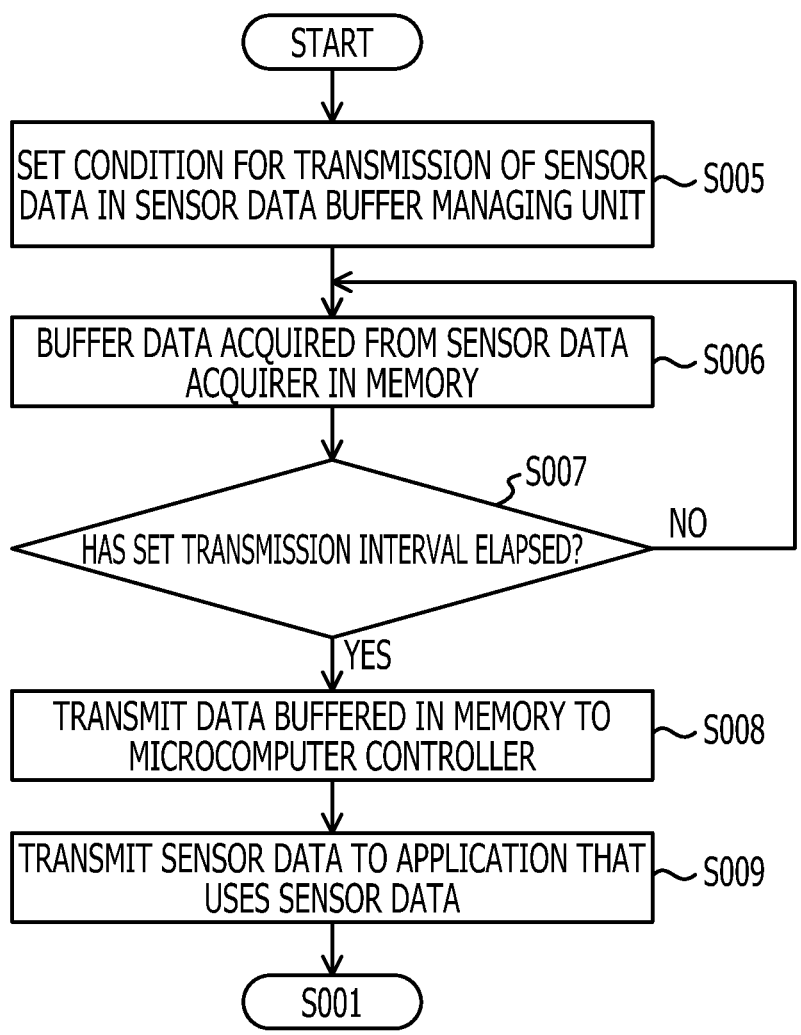
FIG. 5 is a first flowchart of a process that is executed by a microcomputer.

FIGS. 4 and 5 are flowcharts of processes that are executed by the mobile terminal device 100 according to the present embodiment. The processes that are executed by the mobile terminal device 100 according to the present embodiment are described below with reference to FIGS. 4 and 5.

In S001, the terminal state monitoring unit 224 determines whether or not the OS 222 has notified the terminal state monitoring unit 224 of the foreground change event. If the OS 222 has notified the terminal state monitoring unit 224 of the foreground change event, the terminal state monitoring unit 224 causes the process to proceed to S002. If the OS 222 has not notified the terminal state monitoring unit 224 of the foreground change event, the terminal state monitoring unit 224 causes the process to return to S001.

In S002, the terminal state monitoring unit 224 determines whether or not real-time transmission of sensor data is desired for the application 228 that is being executed in the foreground, and the terminal state monitoring unit 224 references the sensor data transmission condition table 440 and acquires a condition for the transmission of the sensor data on the basis of the process ID received from the microcomputer controller 226, while the condition corresponds to the state of the mobile terminal device 100. If the mobile terminal device 100 is in the state in which "the application that is executed in the foreground and uses the sensor data is the application A", the terminal state monitoring unit 224 sets the time interval to transmit the sensor data to 0 seconds. If the mobile terminal device 100 is in the state in which the application that is executed in the foreground and uses the sensor data is the application B or C", the terminal state monitoring unit 224 sets the time interval to transmit the sensor data to 2 seconds. Then, the terminal state monitoring unit 224 causes the process to proceed to S003.

In S003, the terminal state monitoring unit 224 transmits the condition (for the transmission of the sensor data) received in S002 to the microcomputer controller 226. Then, the terminal state monitoring unit 224 causes the process to proceed to S004.

In S004, the microcomputer controller 226 transmits the condition (for the transmission of the sensor data) received from the terminal state monitoring unit 224 to the request processor 302. The microcomputer controller 226 terminates the process.

FIG. 5 is the flowchart of the process that is executed by the microcomputer 300 included in the mobile terminal device 100 according to the present embodiment.

In S005, the request processor 302 sets the condition (for the transmission of the sensor data) received from the microcomputer controller 226 in the sensor data buffer managing unit 304. Specifically, if the mobile terminal device 100 is in the state in which "the application that uses the sensor data and is executed in the foreground is the application A", the request processor 302 sets the sensor data transmission interval of 0 seconds in the sensor data buffer managing unit 304.

If the mobile terminal device 100 is in the state in which "the application that uses the sensor data and is executed in the foreground is the application B or C", the request processor 302 sets the sensor data transmission interval of 2 seconds in the sensor data buffer managing unit 304. Then, the request processor 302 causes the process to proceed to S006.

In S006, the sensor data buffer managing unit 304 causes the sensor data acquired by the sensor data acquirer 306 from the sensors 218 to 220 to be buffered in the memory 308. Specifically, the sensor data buffer managing unit 304 causes a sensor data table 500 to be stored in the memory 308, for example. The sensor data table 500 has an item 502 for time stamps and an item 504 for the sensor data. The sensor data buffer managing unit 304 associates time information with acceleration data in the sensor data table 500 and causes the time information and the acceleration data to be recorded in the sensor data table 500. The sensor data buffer managing unit 304 causes the process to proceed to S007.

In S007, the sensor data buffer managing unit 304 determines whether or not the time interval set by the request processor 302 in S005 has elapsed. Specifically, if the mobile terminal device 100 is in the state in which "the application that uses the sensor data and is executed in the foreground is the application B or C", the sensor data buffer managing unit 304 determines whether or not the time of 2 seconds that is the time interval to transmit the sensor data has elapsed. If the set transmission interval has elapsed, the sensor data buffer managing unit 304 causes the process to proceed to S008. If the set transmission interval has not elapsed, the sensor data buffer managing unit 304 causes the process to return to S006. If the mobile terminal device 100 is in the state in which "the application that uses the sensor data and is executed in the foreground is the application A", the time interval to transmit the sensor data is 0 seconds. Thus, the sensor data buffer managing unit 304 causes the process to proceed to S008.

In S008, the sensor data buffer managing unit 304 transmits the sensor data buffered in the memory 308 to the microcomputer controller 226. Then, the sensor data buffer managing unit 304 causes the process to proceed to S009.

In S009, the microcomputer controller 226 sequentially transmits the sensor data received from the sensor data buffer managing unit 304 to the application 228 (using the sensor data) in order from the oldest sensor data. The microcomputer controller 226 causes the process to return to S001.

Third Embodiment

Figure 6:
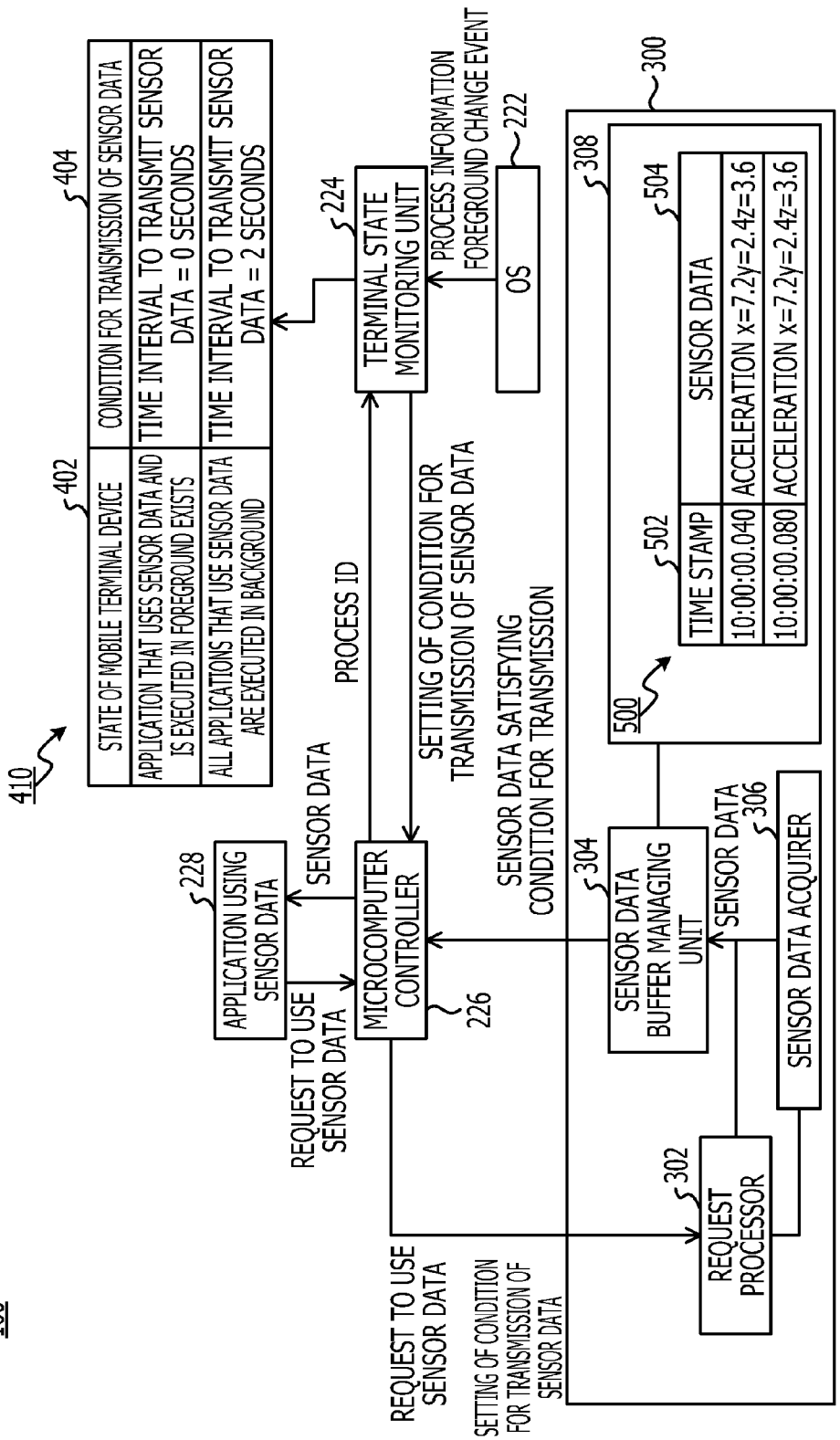
FIG. 6 is a third block diagram illustrating a configuration of the mobile terminal device.

FIG. 6 is a block diagram illustrating a configuration of the mobile terminal device 100 according to a third embodiment. Parts that are described with reference to FIGS. 2 and 3 and illustrated in FIG. 6 are indicated by the same reference numerals as those illustrated in FIGS. 2 and 3, and a description thereof is omitted. Real-time transmission of sensor data is not desired for a sensing application that uses the sensor data, is executed in the background in a smart phone and does not cause data to be displayed on a screen for an user in many cases, while the smart phone is an example of the mobile terminal device 100. If the application that uses the sensor data is not executed in the foreground, the microcomputer 226 may control the microcomputer 300 so as to cause the microcomputer 300 to buffer the sensor data in the memory 308. The terminal state monitoring unit 224 monitors process information acquired from the OS 222 and a foreground change event acquired from the OS 222. An application that is executed in the foreground is an application of which an execution result is displayed on the LCD 213. An application that is executed in the background is an application of which an execution result is not displayed on the LCD 213.

When receiving the request to use the sensor data from the application 228 that uses the sensor data, the microcomputer controller 226 transmits, to the terminal state monitoring unit 224, a process ID that identifies a process of the application 228. The terminal state monitoring unit 224 acquires, on the basis of the process ID received from the microcomputer controller 226, the type of the application 228 in which the process is executed. Then, if the application 228 that uses the sensor data is executed in the foreground, the microcomputer controller 226 controls the microcomputer 300 so as not to cause the microcomputer 300 to buffer the sensor data in the memory 308. If the application 228 that uses the sensor data is executed in the background, the microcomputer controller 226 controls the microcomputer 300 so as to cause the microcomputer 300 to buffer the sensor data in the memory 308.

The terminal state monitoring unit 224 stores a process ID list of applications that use sensor data. If an application that is executed in the foreground is changed, and the application that uses the sensor data is executed in the foreground, the terminal state monitoring unit 224 causes the microcomputer controller 226 to control the microcomputer 300 so as not to cause the microcomputer 300 to buffer the sensor data in the memory 308. If an application that does not use the sensor data is executed in the foreground, the terminal state monitoring unit 224 causes the microcomputer controller 226 to control the microcomputer 300 so as to cause the microcomputer 300 to buffer the sensor data in the memory 308.

A sensor data transmission condition table 410 has an item 402 for states of the mobile terminal device 100 and an item 404 for conditions for transmission of sensor data. If an application that uses the sensor data and is executed in the foreground exists, 0 (seconds) is described in the item 404 as a time interval to transmit the sensor data in order not to buffer the sensor data. If all applications that use the sensor data are executed in the background, 2 (seconds) is described in the item 404 as the time interval to transmit the sensor data.

If an application that uses the sensor data and is executed in the foreground exists, the OS 222 notifies the terminal state monitoring unit 224 of the fact that the application that uses the sensor data and is executed in the foreground exists.

Figure 7:
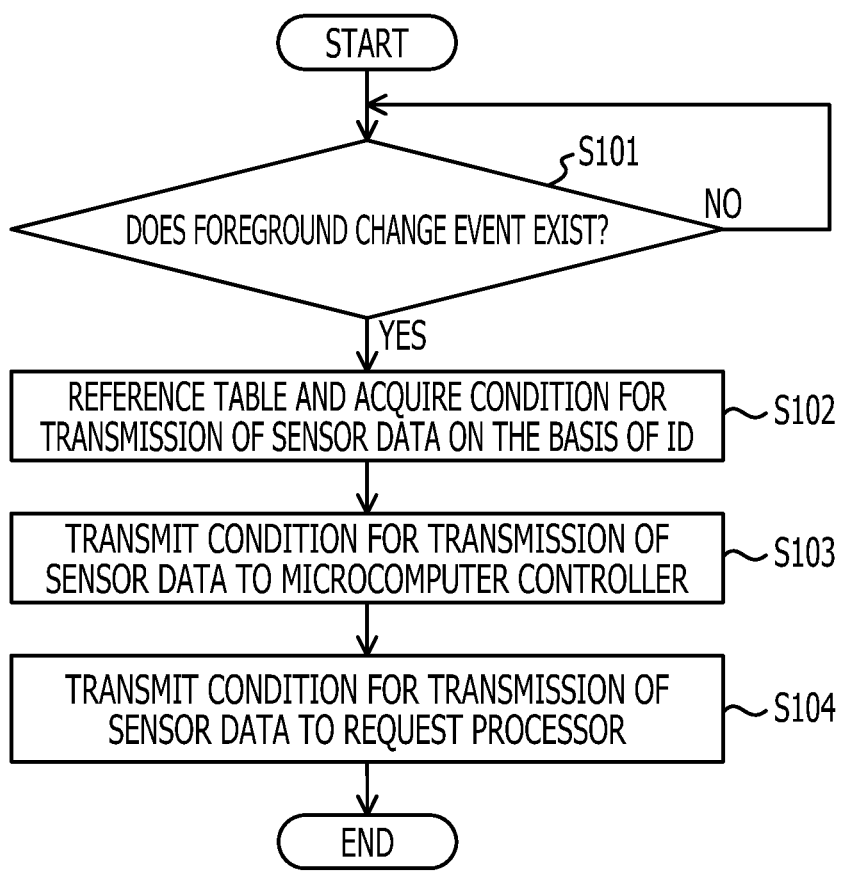
FIG. 7 is a second flowchart of a process that is executed by the mobile terminal device.
Figure 8:
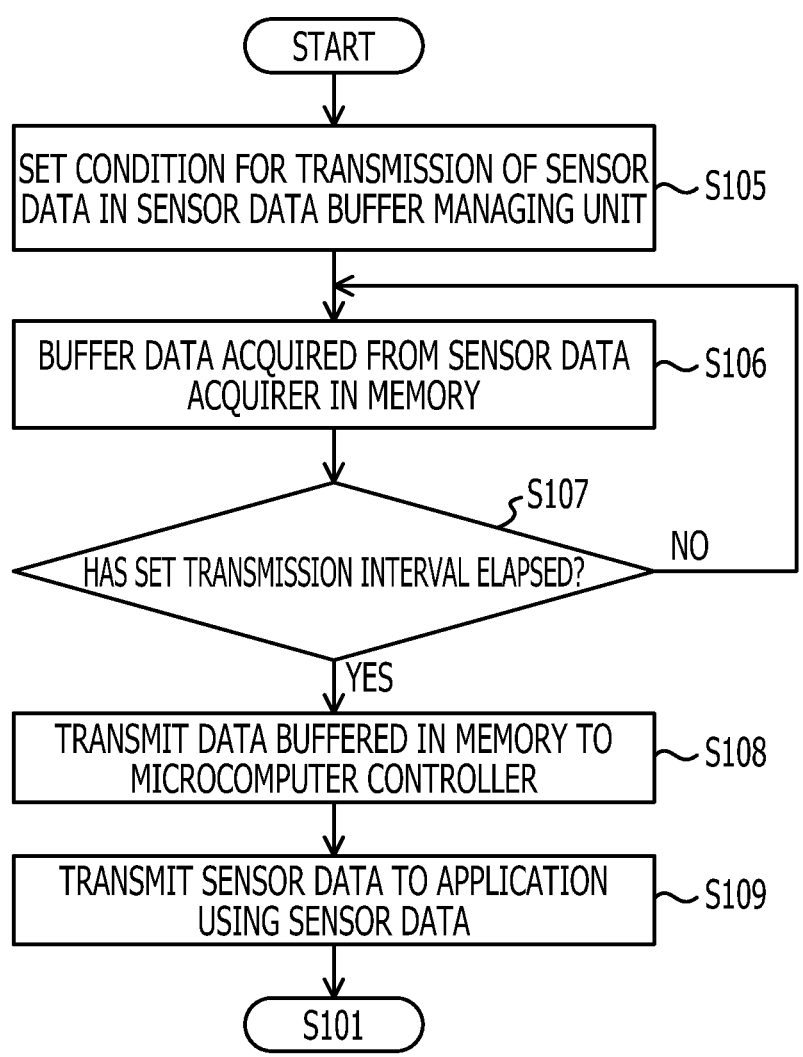
FIG. 8 is a second flowchart of a process that is executed by the microcomputer.

FIGS. 7 and 8 are flowcharts of processes that are executed by the mobile terminal device 100 according to the present embodiment. The processes that executed by the mobile terminal device 100 according to the present embodiment are described with reference to FIGS. 7 and 8.

In S101, the terminal state monitoring unit 224 determines whether or not the OS 222 has notified the terminal state monitoring unit 224 of the foreground change event. If the OS 222 has notified the terminal state monitoring unit 224 of the foreground change event, the terminal state monitoring unit 224 causes the process to proceed to S102. If the OS 222 has not notified the terminal state monitoring unit 224 of the foreground change event, the terminal state monitoring unit 224 causes the process to return to S101.

In S102, the terminal state monitoring unit 224 determines, on the basis of the process ID received from the microcomputer controller 226, whether the application 228 that uses the sensor data and is being executed in the foreground or the background, and the terminal state monitoring unit 224 references the sensor data transmission condition table 410 and acquires a condition for transmission of the sensor data, while the condition corresponds to the state of the mobile terminal device 100. If the mobile terminal device 100 is in the state in which "an application that use the sensor data and is executed in the foreground exists", the terminal state monitoring unit 224 set a time interval to transmit the sensor data to 0 seconds. If the mobile terminal device 100 is in the state in which "all applications that use the sensor data are executed in the background", the terminal state monitoring unit 224 sets the time interval to transmit the sensor data to 2 seconds. The terminal state monitoring unit 224 causes the process to proceed to S103.

In S103, the terminal state monitoring unit 224 transmits the condition (for the transmission of the sensor data) received in S102 to the microcomputer controller 226. The terminal state monitoring unit 224 causes the process to proceed to S104.

In S104, the microcomputer controller 226 transmits the condition (for the transmission of the sensor data) received from the terminal state monitoring unit 224 to the request processor 302. The microcomputer controller 226 terminates the process.

FIG. 8 is the flowchart of the process that is executed by the microcomputer 300 included in the mobile terminal device 100 according to the present embodiment.

In S105, the request processor 302 sets the condition (for the transmission of the sensor data) received from the microcomputer controller 226 in the sensor data buffer managing unit 304. Specifically, if the mobile terminal device 100 is in the state in which "an application that uses the sensor data and is executed in the foreground exists", the request processor 302 sets the sensor data transmission interval of 0 seconds in the sensor data buffer managing unit 304. If the mobile terminal device 100 is in the state in which "all applications that use the sensor data are executed in the background", the request processor 302 sets the sensor data transmission interval of 2 seconds in the sensor data buffer managing unit 304. The request processor 302 causes the process to proceed to S106.

In S106, the sensor data buffer managing unit 304 buffers the sensor data acquired by the sensor data acquirer 306 from the sensors 218 to 220 in the memory 308. Specifically, the sensor data buffer managing unit 304 causes the sensor data table 500 to be stored in the memory 308. The sensor data table 500 has the item 502 for time stamps and the item 504 for the sensor data, for example. The sensor data buffer managing unit 304 associates time information with acceleration data in the sensor data table 500 and causes the time information and the acceleration data to be recorded in the sensor data table 500. The sensor data buffer managing unit 304 causes the process to proceed to S107.

In S107, the sensor data buffer managing unit 304 determines whether or not the time interval set by the request processor 302 in S105 has elapsed. Specifically, if the mobile terminal device 100 is in the state in which "all applications that use the sensor data are executed in the background", the sensor data buffer managing unit 304 determines whether or not the time of 2 seconds that is the sensor data transmission interval has elapsed. If the set transmission interval has elapsed, the sensor data buffer managing unit 304 causes the process to proceed to S108. If the set transmission interval has not elapsed, the sensor data buffer managing unit 304 causes the process to return to S106. If the mobile terminal device 100 is in the state in which "an application that uses the sensor data and is executed in the foreground exists", the sensor data transmission interval is 0 seconds, and the sensor data buffer managing unit 304 causes the process to proceed to S108.

In S108, the sensor data buffer managing unit 304 transmits the sensor data buffered in the memory 308 to the microcomputer controller 226. The sensor data buffer managing unit 304 causes the process to proceed to S109.

In S109, the microcomputer controller 226 sequentially transmits the sensor data received from the sensor data buffer managing unit 304 to the application using the sensor data in order from the oldest sensor data. The microcomputer controller 226 causes the process to return to S101.

Fourth Embodiment

Figure 9:
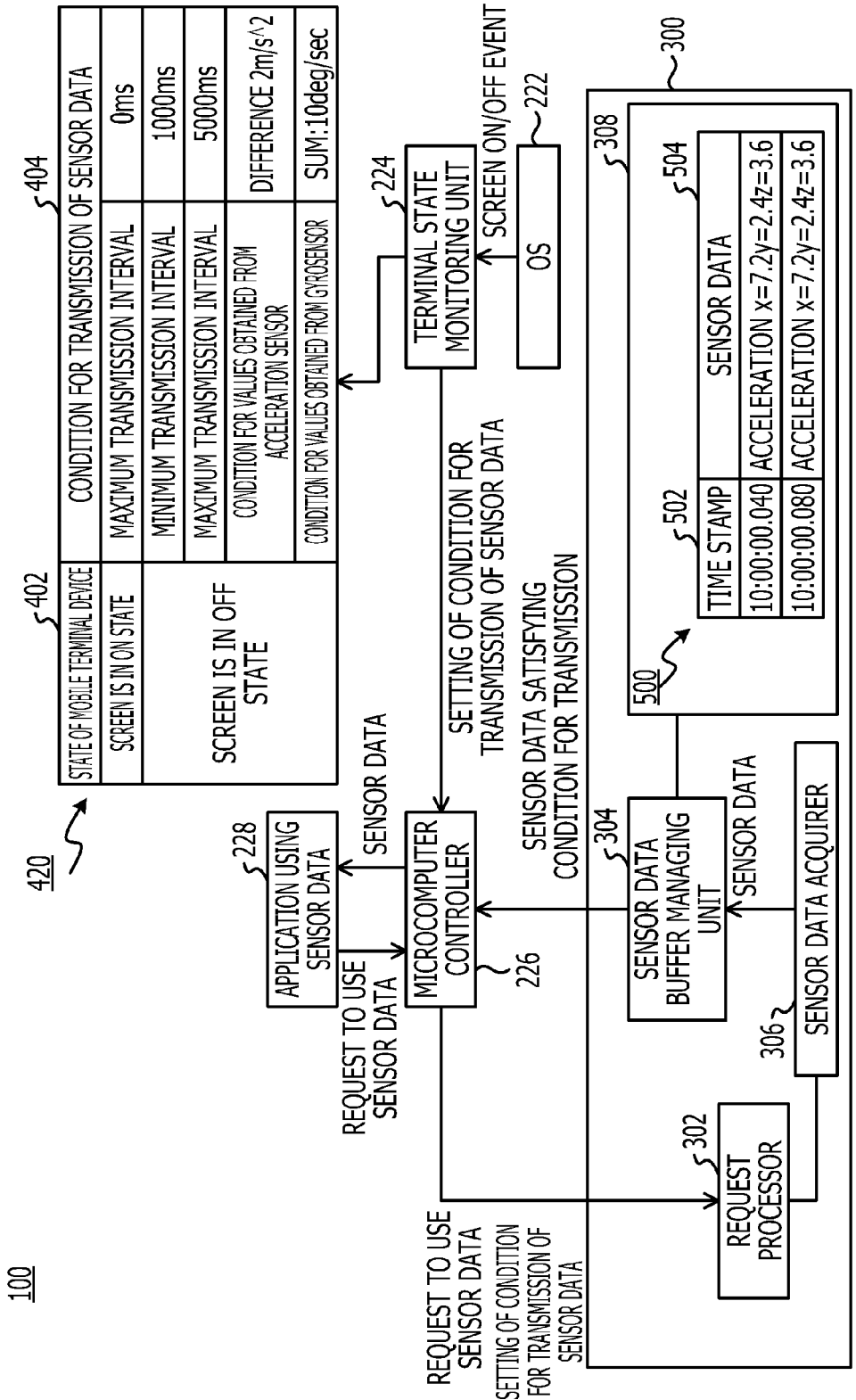
FIG. 9 is a fourth block diagram illustrating a configuration of the mobile terminal device.

FIG. 9 is a block diagram illustrating a configuration of the mobile terminal device 100 according to a fourth embodiment. Parts that are described with reference to FIGS. 2, 3 and 6 and illustrated in FIG. 9 are indicated by the same reference numerals as those illustrated in FIGS. 2, 3 and 6, and a description thereof is omitted. Real-time transmission of sensor data is not desired for an application that uses the sensor data, is executed in a smart phone and does not cause data to be displayed on a screen for an user in many cases, while the smart phone is an example of the mobile terminal device 100. The present embodiment describes an example in which the terminal state monitoring unit 224 monitors a screen ON/OFF event acquired from the OS 222.

In each of the aforementioned embodiments, a time interval to transmit sensor data is used as a condition for the transmission of the sensor data. Another condition for the transmission of the sensor data may be used, while the condition depends on the contents of the sensor data. For example, when a variation in the sensor data is small, the sensor data may not be greatly desired for an application that uses the sensor data. The terminal state monitoring unit 224 may set the sensor data transmission interval to a small value when the difference between sensor data buffered in the memory 308 and previously transmitted and sensor data that has been buffered in the memory 308 and is to be transmitted is equal to or larger than a threshold, or when the sum of the sensor data buffered in the memory 308 is equal to or larger than a threshold. The terminal state monitoring unit 224 may set the sensor data transmission interval to a large value when the sensor data buffered in the memory 308 is not changed, compared with the sensor data previously transmitted.

A sensor data transmission condition table 420 has an item 402 for states of the mobile terminal device 100 and an item 404 for conditions for transmission of sensor data. If the screen is in an ON state, 0 milliseconds is described as the maximum transmission interval in the item 404. If the screen is in an OFF state, 1000 milliseconds is described as the minimum transmission interval in the item 404, and 5000 milliseconds is described as the maximum transmission interval in the item 404. In addition, if the screen is in the OFF state, 2 (m/s^2) is described in the item 404 of the sensor data transmission condition table 420 as the difference between a value previously obtained from the acceleration sensor 218 and a value lastly obtained from the acceleration sensor 218, while the difference is a condition for values of sensor data obtained from the acceleration sensor 218. Furthermore, if the screen is in the OFF state, 10 (deg/sec) is described in the item 404 of the sensor data transmission condition table 420 as the sum of values obtained from the gyrosensor 220, while the sum is a condition for values obtained from the gyrosensor 220.

The sensor data buffer managing unit 304 transmits the sensor data to the microcomputer controller 226 "if the minimum transmission interval has elapsed after the previous transmission and the sensor data satisfies the conditions for the values of the sensor data" or "if the maximum transmission interval has elapsed after the previous transmission". In the present embodiment, if the screen is in the ON state, the maximum transmission interval is set to 0 milliseconds, and the sensor data buffer managing unit 304 transmits the sensor data to the microcomputer controller 226 without causing the sensor data to be buffered. If the screen is in the OFF state, and the time of 5000 milliseconds has elapsed after the previous transmission of the sensor data, the sensor data buffer monitoring unit 304 immediately transmits the sensor data to the microcomputer controller 226. When the time of 1000 milliseconds has elapsed after the previous transmission, and a value obtained from acceleration sensor 218 changes by 2 (m/s^2) or more, compared with a value obtained from acceleration sensor 218 and previously transmitted, or the sum of values obtained from the gyrosensor 220 and buffered in the memory 308 reaches 10 (deg/sec), the sensor data buffer managing unit 304 transmits the sensor data to the microcomputer controller 226. In this configuration, a time interval to transmit sensor data may be changed on the basis of the contents of the sensor data.

Figure 10:
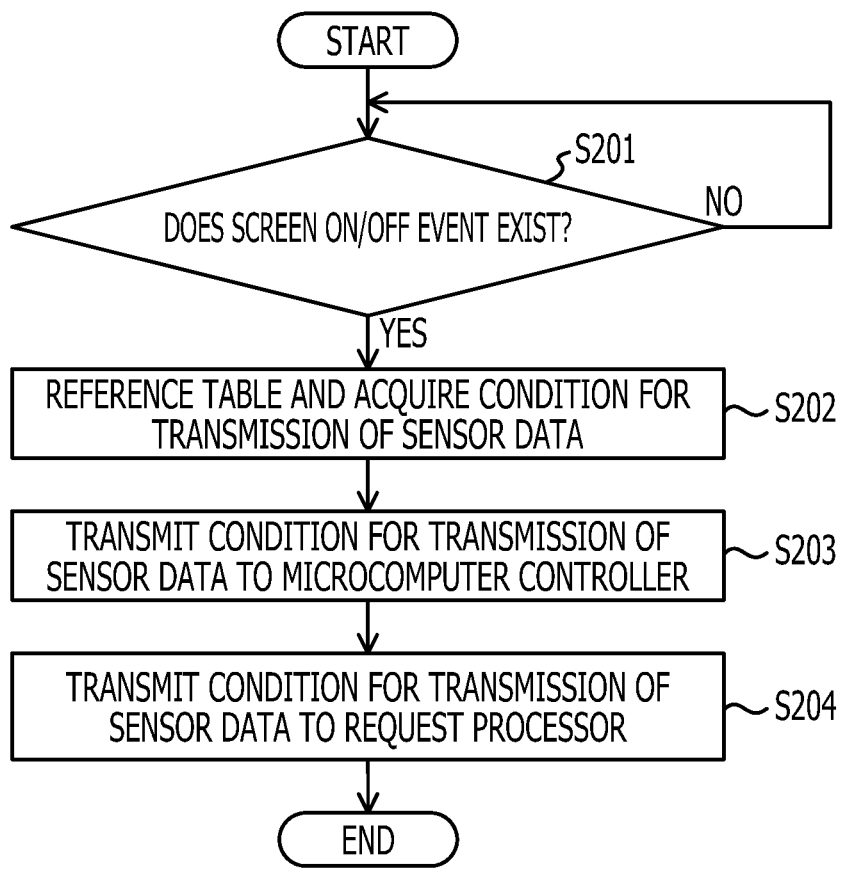
FIG. 10 is a third flowchart of a process that is executed by the mobile terminal device.
Figure 11:
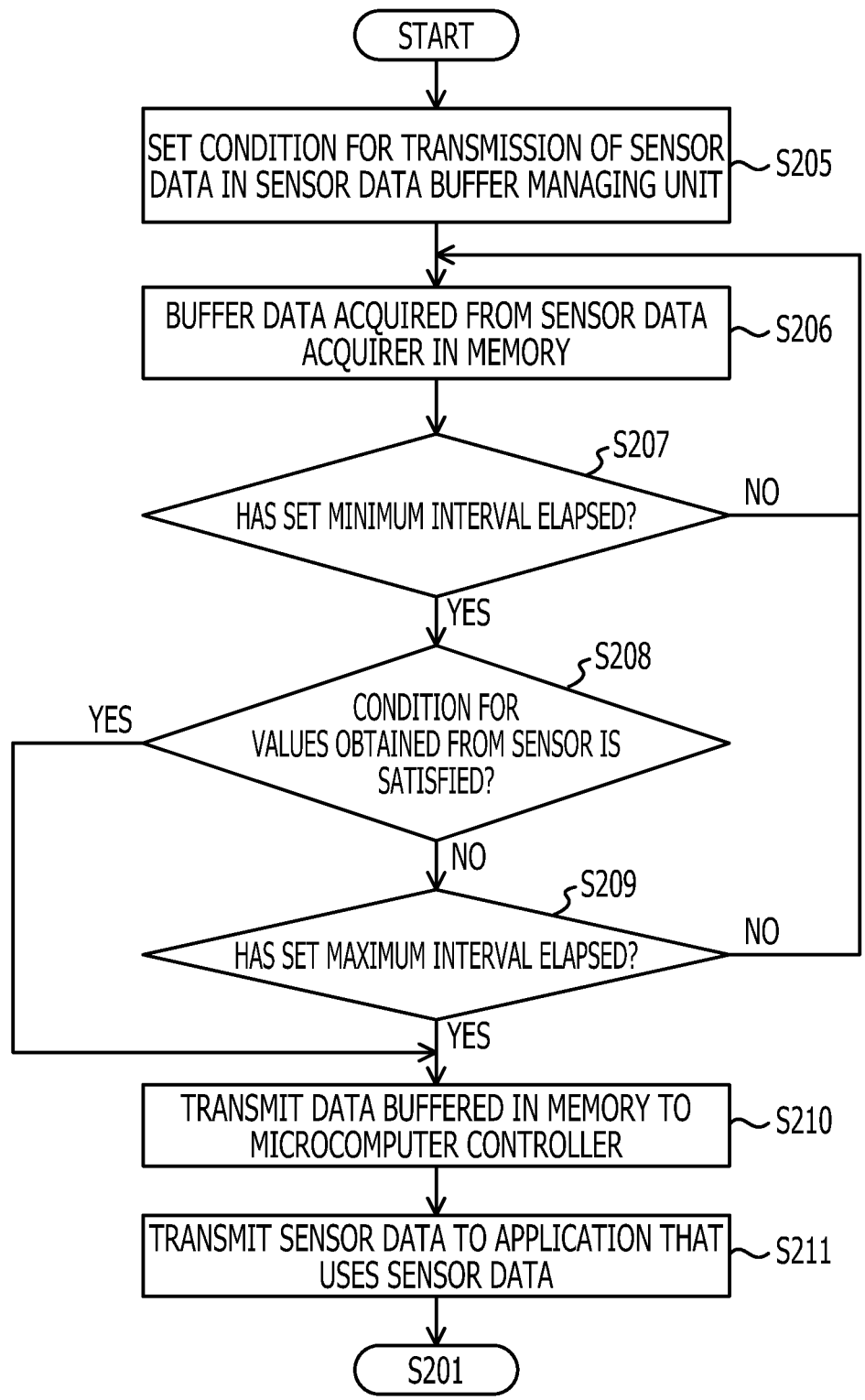
FIG. 11 is a third flowchart of a process that is executed by the microcomputer.

FIGS. 10 and 11 are flowcharts of processes that are executed by the mobile terminal device 100 according to the present embodiment. The processes that are executed by the mobile terminal device 100 according to the present embodiment are described with reference to FIGS. 10 and 11.

In S201, the terminal state monitoring unit 224 determines whether or not the OS 222 has notified the terminal state monitoring unit 224 of a screen ON/OFF event. If the OS 222 has notified the terminal state monitoring unit 224 of the screen ON/OFF event, the terminal state monitoring unit 224 causes the process to proceed to S202. If the OS 222 has not notified the terminal state monitoring unit 224 of the screen ON/OFF event, the terminal state monitoring unit 224 causes the process to return to S201.

In S202, the terminal state monitoring unit 224 references the sensor data transmission condition table 420 and acquires a condition for transmission of sensor data on the basis of the screen ON/OFF event of which the OS 222 has notified the terminal state monitoring unit 224, while the condition corresponds to the state of the mobile terminal device 100. If the mobile terminal device 100 is in the state in which "the screen is in the ON state", the terminal state monitoring unit 224 sets the maximum transmission interval to 0 milliseconds. If the mobile terminal device 100 is in the state in which "the screen is in the OFF state", the terminal state monitoring unit 224 sets the minimum transmission interval to 1000 milliseconds and the maximum transmission interval to 5000 milliseconds, sets the difference between the value previously obtained from the acceleration sensor 218 and the value lastly obtained from the acceleration sensor 218 to 2 (m/s^2) as the condition for values obtained from the acceleration sensor 218, and sets the sum of values obtained from the gyrosensor 220 to 10 (deg/sec) as the condition for values obtained from the gyrosensor 220. The terminal state monitoring unit 224 causes the process to proceed to S203.

In S203, the terminal state monitoring unit 224 transmits the condition (for the transmission of the sensor data) acquired in S202 to the microcomputer controller 226. The terminal state monitoring unit 224 causes the process to proceed to S204.

In S204, the microcomputer controller 226 transmits the condition (for the transmission of the sensor data) received from the terminal state monitoring unit 224 to the request processor 302. The microcomputer controller 226 terminates the process.

FIG. 11 is the flowchart of the process that is executed by the microcomputer 300 included in the mobile terminal device 100 according to the present embodiment.

In S205, the request processor 302 sets the condition (for the transmission of the sensor data) received from the microcomputer controller 226 in the sensor data buffer monitoring unit 304. Specifically, if the mobile terminal device 100 is in the state in which "the screen is in the ON state", the request processor 302 sets the maximum transmission interval of 0 milliseconds in the sensor data buffer monitoring unit 304. If the mobile terminal device 100 is in the state in which "the screen is in the OFF state", the request processor 302 sets the minimum transmission interval of 1000 milliseconds and the maximum transmission interval of 5000 milliseconds in the sensor data buffer monitoring unit 304, sets the difference between a value previously obtained from the acceleration sensor 218 and a value lastly obtained from the acceleration sensor 218 to 2 (m/s^2) as the condition for values obtained from the acceleration sensor 218 in the sensor data buffer monitoring unit 304, and sets the sum of values obtained from the gyrosensor 220 to 10 (deg/sec) as the condition for values obtained from the gyrosensor 220 in the sensor data buffer monitoring unit 304. The request processor 302 causes the process to proceed to S206.

In S206, the sensor data buffer monitoring unit 304 causes the sensor data acquired by the sensor data acquirer 306 from the sensors 218 to 220 to be buffered in the memory 308. Specifically, the sensor data buffer monitoring unit 304 causes the sensor data table 500 to be stored in the memory 308, for example. The sensor data table 500 has the item 502 for time stamps and the item 504 for the sensor data. The sensor data buffer managing unit 304 associates time information with acceleration data in the sensor data table 500 and causes the time information and the acceleration data to be recorded in the sensor data table 500. The sensor data buffer managing unit 304 causes the process to proceed to S207.

In S207, the sensor data buffer managing unit 304 determines whether or not the minimum transmission interval set by the request processor 302 in S205 has elapsed. Specifically, if the mobile terminal device 100 is in the state in which "the screen is in the OFF state", the sensor data buffer managing unit 304 determines whether or not the time of 1000 milliseconds that is the minimum transmission interval has elapsed. If the set minimum transmission interval has elapsed, the sensor data buffer managing unit 304 causes the process to proceed to S208. If the set minimum transmission interval has not elapsed, the sensor data buffer managing unit 304 causes the process to return to S206.

In S208, the sensor data buffer managing unit 304 determines whether or not the condition for values obtained from any of the sensors 218 and 220 is satisfied. Specifically, if the mobile terminal device 100 is in the state in which "the screen is in the OFF state", the sensor data buffer managing unit 304 determines whether or not the difference between a value previously obtained from the acceleration sensor 218 and a value lastly obtained from the acceleration sensor 218 is 2 (m/s^2) that is the condition for values obtained from the acceleration sensor 218, or the sensor data buffer managing unit 304 determines whether or not the sum of values obtained from the gyrosensor 220 is 10 (deg/sec) that is the condition for values obtained from the gyrosensor 220. If the condition for values obtained from the sensor 218 or 220 is satisfied, the sensor data buffer managing unit 304 causes the process to proceed to S210. If the condition for values obtained from the sensor 218 or 220 is not satisfied, the sensor data buffer managing unit 304 causes the process to proceed to S209.

In S209, the sensor data buffer managing unit 304 determines whether or not the maximum transmission interval set by the request processor 302 in S205 has elapsed. Specifically, if the mobile terminal device 100 is in the state in which "the screen is in the OFF state", the sensor data buffer managing unit 304 determines whether or not the time of 5000 milliseconds that is the maximum transmission interval has elapsed. If the set maximum transmission interval has elapsed, the sensor data buffer managing unit 304 causes the process to proceed to S210. If the set maximum transmission interval has not elapsed, the sensor data buffer managing unit 304 causes the process to return to S206.

If the mobile terminal device 100 is in the state in which that "the screen is in the ON state", the maximum transmission interval is 0 seconds, and the sensor data buffer managing unit 304 determines that the answer is "YES" in S207, determines that the answer is "NO" in S208, determines that the answer is "YES" in S209, and causes the process to proceed to S210.

In S210, the sensor data buffer managing unit 304 transmits the sensor data buffered in the memory 308 to the microcomputer controller 226. The sensor data buffer managing unit 304 causes the process to proceed to S211.

In S211, the microcomputer controller 226 sequentially transmits the sensor data received from the sensor data buffer managing unit 304 to the application 228 using the sensor data in order from the oldest sensor data. The microcomputer controller 226 causes the process to return to S201.

Fifth Embodiment

Figure 12:
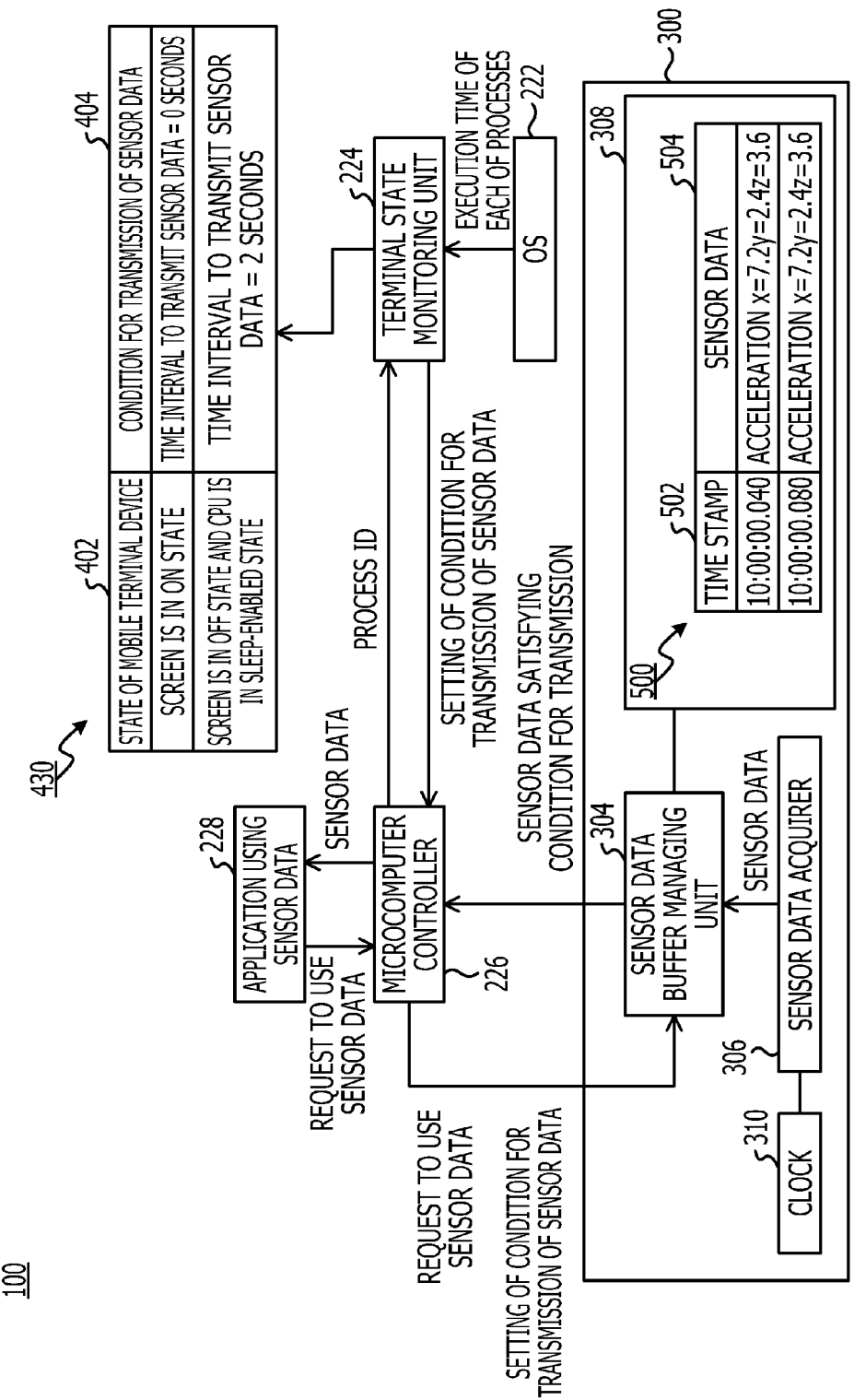
FIG. 12 is a fifth block diagram illustrating a configuration of the mobile terminal device.

FIG. 12 is a block diagram illustrating a configuration of the mobile terminal device 100 according to a fifth embodiment. Parts that are described with reference to FIGS. 2, 3, 6 and 9 and illustrated in FIG. 12 are indicated by the same reference numerals as those illustrated in FIGS. 2, 3, 6 and 9, and a description thereof is omitted. An effect of saving power when sensor data is buffered is produced when the CPU 201 is in the sleep state. The following method may be considered. The method is to cause the terminal state monitoring unit 224 to handle an event of causing the CPU 201 to become the sleep state and is to cause the terminal state monitoring unit 224 to set a condition for transmission of sensor data both when the CPU 201 becomes the sleep state and when the CPU 201 becomes the wake state. The CPU 201, however, repeatedly changes its state from the sleep state to the wake state and vice versa due to an execution of an application that uses the sensors data. Thus, when the condition for the transmission of the sensor data is set so that the sensor data is not buffered during the wake state of the CPU 201, the application is not appropriately executed. To avoid this, the terminal state monitoring unit 224 may monitor an execution state of a process other than applications that use the sensor data.

When receiving the request to use the sensor data from the application 228 that uses the sensor data, the microcomputer controller 226 transmits, to the terminal state monitoring unit 224, ID information that identifies a process of the application 228. The terminal state monitoring unit 224 monitors whether the screen is in the ON state or the OFF state. If the screen is in the OFF state, the terminal state monitoring unit 224 periodically checks a period of time to execute a process other than applications that use the sensor data. If a period of time for an application other than the applications using the sensor data to use the CPU 201 is equal to or shorter than a threshold, the microcomputer control 226 controls the microcomputer 300 so as to cause the microcomputer 300 to buffer the sensor data in the memory 308 and determines a sleep-enabled state in which the CPU 201 may become the sleep state. If the screen is in the OFF state and the CPU is in the sleep-enabled state, the microcomputer control 226 controls the microcomputer 300 so as to cause the microcomputer 300 to buffer the sensor data in the memory 308.

A sensor data transmission condition table 430 has an item 402 for states of the mobile terminal device 100 and an item 404 for conditions for transmission of sensor data. If the screen is in the ON state, 0 (seconds) is described in the item 404 as the time interval to transmit the sensor data. If the screen is in the OFF state and the CPU is in the sleep-enabled state, 2 (seconds) is described in the item 404 as the time interval to transmit the sensor data.

Figure 13:
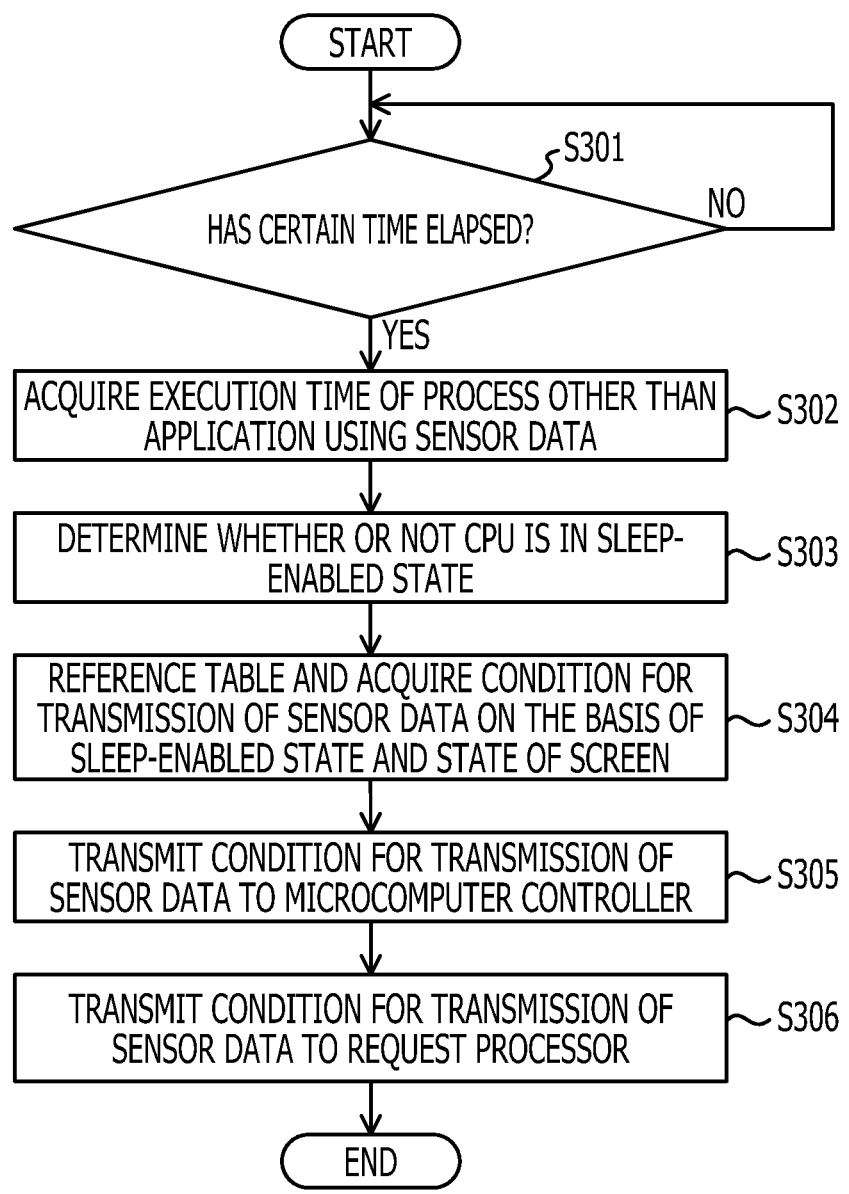
FIG. 13 is a fourth flowchart of a process that is executed by the mobile terminal device.
Figure 14:
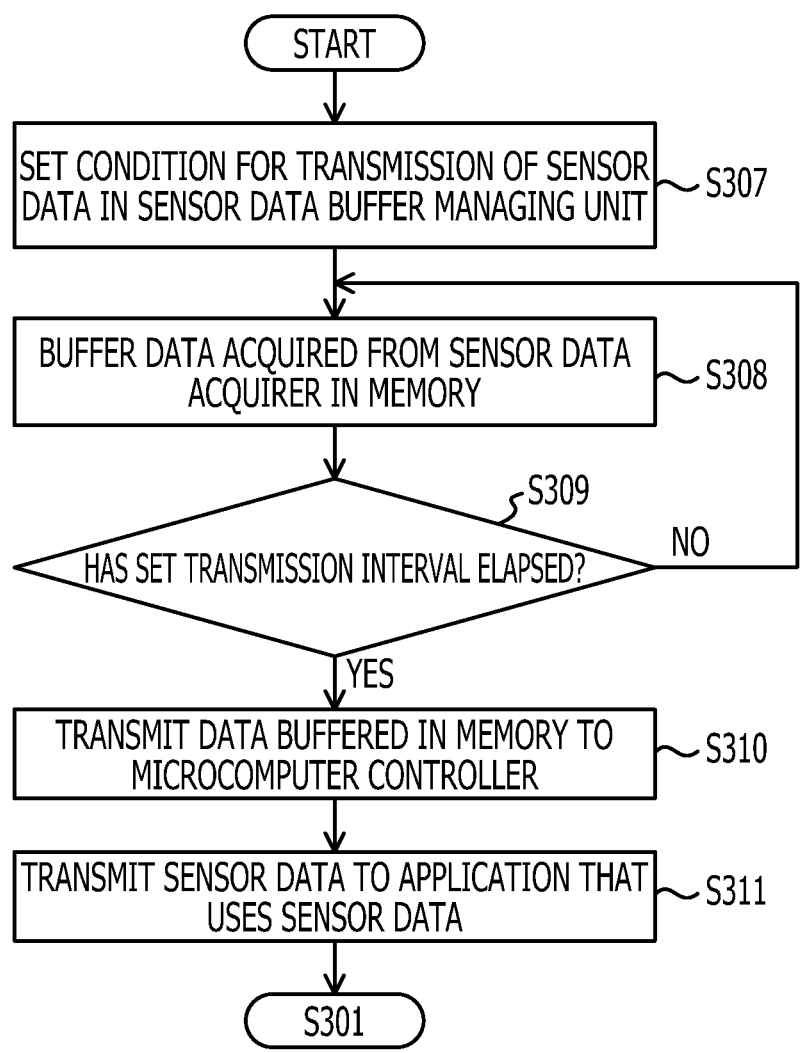
FIG. 14 is a fourth flowchart of a process that is executed by the microcomputer.

FIGS. 13 and 14 are flowcharts of processes that are executed by the mobile terminal device 100 according to the present embodiment. The processes that are executed by the mobile terminal device 100 according to the present embodiment are described with reference to FIGS. 13 and 14.

In S301, the terminal state monitoring unit 224 determines whether or not a certain time has elapsed. If the certain time has elapsed, the terminal state monitoring unit 224 causes the process to proceed to S302. If the certain time has not elapsed, the terminal state monitoring unit 224 causes the process to return to S301.

In S302, the terminal state monitoring unit 224 acquires, from the OS 222 on the basis of a process ID received from the microcomputer controller 226, an execution time of a process other than applications that use the sensor data. The terminal state monitoring unit 224 causes the process to proceed to S303.

In S303, the terminal state monitoring unit 224 determines whether or not the execution time (of the process other than the applications using the sensor data) acquired from the OS 222 is equal to or shorter than a threshold, and whereby the terminal state monitoring unit 224 determines whether or not the CPU 201 is in the sleep-enabled state. If the execution time of the process other than the applications using the sensor data is equal to or shorter than the threshold, the terminal state monitoring unit 224 determines that the CPU 201 is in the sleep-enabled state. If the execution time of the process other than the applications using the sensor data is longer than the threshold, the terminal state monitoring unit 224 determines that the CPU 201 is not in the sleep-enabled state. The terminal state monitoring unit 224 causes the process to proceed to S304.

In S304, the terminal state monitoring unit 224 references the sensor data transmission condition table 430 and acquires a condition for transmission of the sensor data on the basis of the sleep-enabled state and the state of the screen. If the mobile terminal device 100 is in the state in which "the screen is in the ON state", the terminal state monitoring unit 224 sets the sensor data transmission interval to 0 seconds. If the mobile terminal device 100 is in the state in which "the screen is in the OFF state" and "the CPU 201 is in the sleep-enabled state", the terminal state monitoring unit 224 sets the sensor data transmission interval to 2 seconds. The terminal state monitoring unit 224 causes the process to proceed to S305.

In S305, the terminal state monitoring unit 224 transmits the condition (for the transmission of the sensor data) acquired in S302 to the microcomputer controller 226. The terminal state monitoring unit 224 causes the process to proceed to S306.

In S306, the microcomputer controller 226 transmits the condition (for the transmission of the sensor data) received from the terminal state monitoring unit 224 to the request processor 302. Then, the microcomputer controller 226 terminates the process.

FIG. 14 is the flowchart of the process that is executed by the microcomputer 300 included in the mobile terminal device 100 according to the present embodiment.

In S307, the request processor 302 sets the condition (for the transmission of the sensor data) received from the microcomputer controller 226 in the sensor data buffer managing unit 304. Specifically, if the mobile terminal device 100 is in the state in which "the screen is in the ON state", the request processor 302 sets the sensor data transmission interval of 0 seconds in the sensor data buffer managing unit 304. If the mobile terminal device 100 is in the state in which "the screen is in the OFF state" and "the CPU 201 is in the sleep-enabled state", the request processor 302 sets the sensor data transmission interval of 2 seconds in the sensor data buffer managing unit 304. The request processor 302 causes the process to proceed to S308.

In S308, the sensor data buffer managing unit 304 buffers the sensor data acquired by the sensor data acquirer 306 from the sensors in the memory 308. Specifically, the sensor data buffer managing unit 304 causes the sensor data table 500 to be stored in the memory 308, for example. The sensor data table 500 has the item 502 for time stamps and the item 504 for the sensor data. The sensor data buffer managing unit 304 associates time information with acceleration data in the sensor data table 500 and causes the time information and the acceleration data to be recorded in the sensor data table 500. The sensor data buffer managing unit 304 causes the process to proceed to S309.

In S309, the sensor data buffer managing unit 304 determines whether or not the transmission interval set by the request processor 302 in S307 has elapsed. Specifically, if the mobile terminal device 100 is in the state in which "the screen is in the OFF state" and "the CPU 201 is in the sleep-enabled state", the sensor data buffer managing unit 304 determines whether or not the time of 2 seconds that is the sensor data transmission interval has elapsed. If the set transmission interval has elapsed, the sensor data buffer managing unit 304 causes the process to proceed to S310. If the set transmission interval has not elapsed, the sensor data buffer managing unit 304 causes the process to return to S308. If the mobile terminal device 100 is in the state in which "the screen is in the ON state", the sensor data transmission interval is 0 seconds, and the sensor data buffer managing unit 304 causes the process to proceed to S310.

In S310, the sensor data buffer managing unit 304 transmits the sensor data buffered in the memory 308 to the microcomputer controller 226. The sensor data buffer managing unit 304 causes the process to proceed to S311.

In S311, the microcomputer controller 226 sequentially transmits the sensor data received from the sensor data buffer managing unit 304 to the application 228 using the sensor data in order from the oldest sensor data. The microcomputer controller 226 causes the process to return to S301.

Figure 15:
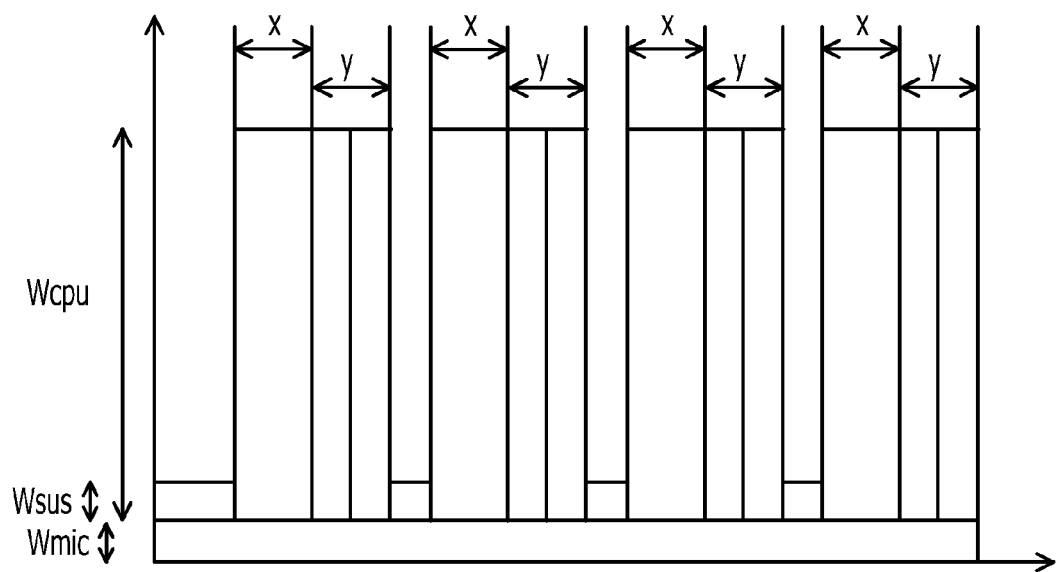
FIG. 15 is a diagram illustrating an operating time of a CPU when data is buffered.
Figure 16:
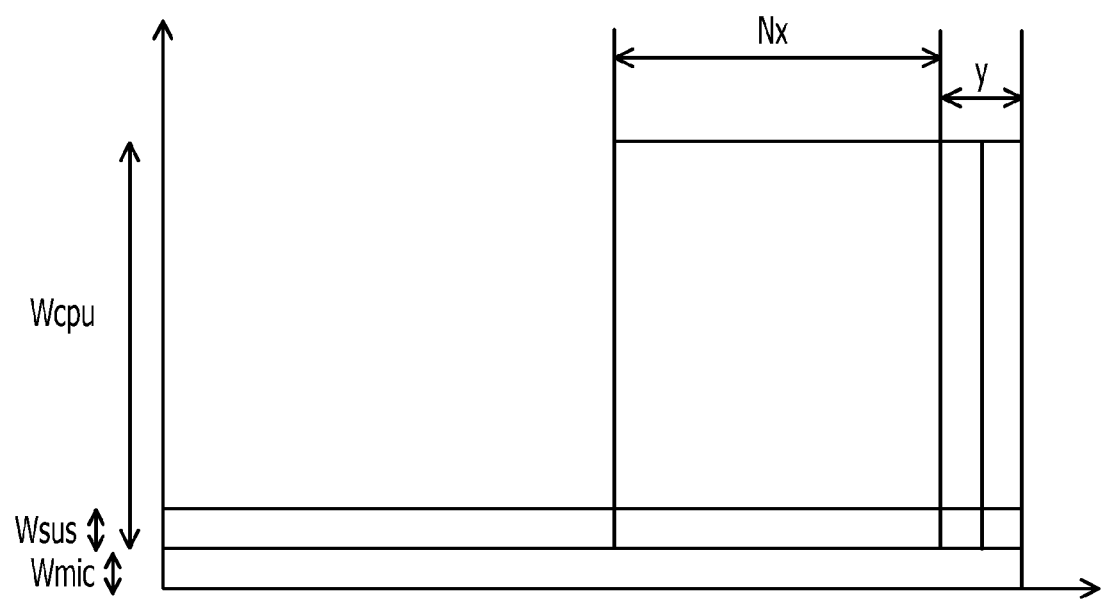
FIG. 16 is a diagram illustrating an operating time of the CPU when data is not buffered.

Effectiveness of the present embodiment described above is described below. Power to be consumed by the mobile terminal device 100 when real-time transmission of sensor data is not desired is compared with power to be consumed when the sensor data is not buffered in the memory 308. FIGS. 15 and 16 illustrate the power to be compared. FIG. 15 is a diagram illustrating a period of time for the CPU 201 to operate when the sensor data is not buffered, while FIG. 16 is a diagram illustrating a period of time for the CPU 201 to operate when the sensor data is to be buffered. Power to be consumed during the operation of the CPU 201 is indicated by $W_{CPU}$. Power to be consumed during the time when the CPU 201 is stopped is indicated by $W_{SUS}$. Power to be consumed by the microcomputer 300 is indicated by $W_{mic}$. A time period in which the CPU 201 operates within a certain time period T is indicated by t. The amount of power to be consumed by sensing executed by the mobile terminal device 100 is a value of $(W_{CPU} \cdot t + W_{SUS} \cdot (T-t) + W_{mic})$. In this case, the condition that the user does not operate the mobile terminal device 100, or applications other than the applications using the sensor data are almost not executed is assumed.

A period of time to process sensor data at one time is indicated by x, while the sum of "a period of time to check the sleep state" and "a period of time to change the state of the CPU 201" is indicated by y. If sensor data is to be buffered and sensor data processed at a number N of times is to be collectively transmitted, a period of time t to cause the CPU 201 to operate in order to process the sensor data at the number N of times is Nx+y. If the sensor data is not buffered, a period of time t to cause the CPU 201 to operate in order to process the sensor data at the number N of times is Nx+Ny. If the sensor data is to be buffered, the amount of power to be consumed by the mobile terminal device 100 is a value of $(W_{CPU} \cdot (Nx+y) + W_{SUS} \cdot (T-(Nx+y)) + W_{mic})$. If the sensor data is not buffered, the amount of power to be consumed by the mobile terminal device 100 is a value of $(W_{CPU} \cdot (Nx+Ny) + W_{SUS} \cdot (T-(Nx+Ny)) + W_{mic})$. In general, $W_{CPU} \gg W_{mimay}$ d $W_{CPU} \gg W_{SUS}$. The ratio of power to be consumed by the mobile terminal device 100 when sensor data is buffered to power to be consumed by the mobile terminal device 100 when the sensor data is not buffered is approximately a value of (Nx+y)/(Nx+Ny). Especially, when x≪y, the power to be consumed by the mobile terminal device 100 when the sensor data is buffered may be reduced to up to approximately 1/N of the power to be consumed by the mobile terminal device 100 when the sensor data is not buffered.

If real-time transmission of sensor data is not desired, power to be consumed by the mobile terminal device 100 is suppressed. If the real-time transmission of the sensor data is desired, or if the CPU 201 does not become the sleep state and the effect of saving power through buffering is not expected, the sensor data is transmitted in real time and whereby a responsive property may be ensured. The present embodiment may be applied to the mobile terminal device 100 without a change in application software of the mobile terminal device 100. In addition, a sampling interval is not changed. Thus, a trajectory calculation or the like may be executed using highly accurate sensor data.

As described above, the buffering of sensor data is controlled on the basis of the state of the mobile terminal device 100. If real-time transmission of sensor data is desired, the sensor data is immediately transmitted so as to ensure the responsive property. If the real-time transmission of the sensor data is not desired, the sensor data is buffered so as to suppress power to be consumed.

The embodiments describe the mobile terminal device 100. The mobile terminal device 100 is not limited to the embodiments and may be modified and changed without departing from the scope of the Claims. For example, if all applications that use the sensor data are executed in the background, and an application that uses sensor data and of which a process has a high priority exists among the applications that are being executed and use the sensor data, a time interval to transmit the sensor data may be set to 0 seconds for the application of which the process has the high priority.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile terminal device comprising:
a first processor that processes data acquired by a sensor; and
a second processor that transmits the data acquired by the sensor to the first processor,
wherein the first processor acquires a transmission condition corresponding to state information of the mobile terminal with reference to association information and transmits the transmission condition to the second processor, the association information associating a transmission condition with state information, the transmission condition being a condition for transmitting the data acquired by the sensor from the second processor to the first processor, the condition defining a variable transmitting timing from the second processor to the first processor,
wherein the second processor transmits the data acquired by the sensor to the first processor in accordance with the transmission condition transmitted by the first processor,
wherein the state information of the mobile terminal is a sleep mode or a wake mode,
wherein when a first application running on the first processor is executed in a foreground, and the first application desires real time transmission of the sensor data, the second processor does not buffer the data,
when the first application is executed in the foreground and the first application does not desire real time transmission of the sensor data, the second processor buffers the data,
when the first application is changed to a second application, and the second application desires real time transmission of the sensor data, the second processor does not buffer the data, and
when the first application is changed to the second application, and the second application does not desire real time transmission of the sensor data, the second processor buffers the data.

2. The mobile terminal device according to claim 1,
wherein the first processor detects executions of a plurality of application programs that use the sensor and transmits the transmission condition to the second processor in accordance with the plurality of application programs.

3. The mobile terminal device according to claim 1,
wherein the first processor detects executions of a plurality of application programs that use the sensor and transmits the transmission condition to the second processor in accordance with whether or not an execution result of any of the plurality of application programs is displayed on a display unit of the mobile terminal device.

4. The mobile terminal device according to claim 1,
wherein the first processor transmits the transmission condition to the second processor in accordance with a result of a determination as to whether or not data is displayed on a display unit of the mobile terminal device.

5. The mobile terminal device according to claim 1,
wherein the transmission condition includes a time interval to transmit the data.

6. The mobile terminal device according to claim 5,
wherein the transmission condition includes a difference between the data and previously transmitted data.

7. A non-transitory medium storing a control program for controlling a mobile terminal device that includes a sensor that acquires data, a first processor that processes the data acquired by the sensor, and a second processor that transmits the data acquired by the sensor to the first processor, the control program causing the first processor to execute a process comprising:

acquiring a transmission condition corresponding to state information acquired by the first processor with reference to association information associating a transmission condition with state information of the mobile terminal device, the transmission condition being a condition for transmitting the data acquired by the sensor from the second processor to the first processor, the condition defining a variable transmitting timing from the second processor to the first processor;

transmitting the transmission condition acquired by the first processor to the second processor to the second processor; and receiving data satisfying the transmission condition from the second processor, wherein the state information of the mobile terminal device is a sleep mode or a wake mode, wherein when a first application running on the first processor is executed in a foreground, and the first application desires real time transmission of the sensor data, the second processor does not buffer the data, when the first application is executed in the foreground and the first application does not desire real time transmission of the sensor data, the second processor buffers the data, when the first application is changed to a second application, and the second application desires real time transmission of the sensor data, the second processor does not buffer the data, and when the first application is changed to the second application, and the second application does not desire real time transmission of the sensor data, the second processor buffers the data.

8. A method for controlling a mobile terminal device that includes a sensor that acquires data, a first processor that processes the data acquired by the sensor, and a second processor that transmits the data acquired by the sensor to the first processor, the method comprising:

causing the first processor to acquire a transmission condition corresponding to state information acquired by the first processor with reference to association information associating a transmission condition with state information of the mobile terminal device, the transmission condition being a condition for transmitting the data acquired by the sensor from the second processor to the first processor, the condition defining a variable transmitting timing from the second processor to the first processor;

causing the first processor to transmit the transmission condition acquired by the first processor to the second processor; and causing the second processor to transmit the data acquired by the sensor to the first processor in accordance with the transmission condition transmitted by the first processor, wherein the state information of the mobile terminal device is a sleep mode or a wake mode, wherein when a first application running on the first processor is executed in a foreground, and the first application desires real time transmission of the sensor data, the second processor does not buffer the data, when the first application is executed in the foreground and the first application does not desire real time transmission of the sensor data, the second processor buffers the data, when the first application is changed to a second application, and the second application desires real time transmission of the sensor data, the second processor does not buffer the data, and when the first application is changed to the second application, and the second application does not desire real time transmission of the sensor data, the second processor buffers the data.

9. The mobile terminal device according to claim 1, wherein the sensor is selected from the group consisting of an acceleration sensor and an accelerometer.

\* \* \* \* \*